(12) United States Patent
Landa et al.

(10) Patent No.: US 7,562,538 B2
(45) Date of Patent: Jul. 21, 2009

(54) METHOD OF MAKING CLEAR GLASS COMPOSITION

(75) Inventors: Ksenia A. Landa, Grosse Ile, MI (US); Leonid Landa, Grosse Ile, MI (US); Richard Hulme, Rochester Hills, MI (US)

(73) Assignee: Guardian Industries Corp., Auburn Hills, MI (US)

( * ) Notice: Subject to any disclaimer, the term of this patent is extended or adjusted under 35 U.S.C. 154(b) by 630 days.

(21) Appl. No.: 11/138,676

(22) Filed: May 27, 2005

(65) Prior Publication Data

US 2006/0270545 A1 Nov. 30, 2006

(51) Int. Cl.
*C03B 5/00* (2006.01)
*C03C 3/11* (2006.01)
*C03C 3/083* (2006.01)
*C03C 3/085* (2006.01)
*C03C 3/087* (2006.01)

(52) U.S. Cl. .......................... 65/134.1; 501/56; 501/68; 501/69; 501/70

(58) Field of Classification Search ................... 501/55, 501/68, 69, 70; 65/134.1
See application file for complete search history.

(56) References Cited

U.S. PATENT DOCUMENTS

| 2,354,164 | A | * | 7/1944 | Weyl | ........................... 501/60 |
|---|---|---|---|---|---|
| 6,342,460 | B1 | | 1/2002 | Akimoto et al. | |
| 6,548,434 | B2 | | 4/2003 | Nagashima | |
| 6,610,622 | B1 | | 8/2003 | Landa et al. | |
| 6,672,108 | B2 | | 1/2004 | Landa et al. | |
| 2003/0199384 | A1 | | 10/2003 | Landa et al. | |
| 2004/0116271 | A1 | | 6/2004 | Thomsen et al. | |
| 2005/0209083 | A1 | * | 9/2005 | Takagi et al. | .................. 501/11 |

FOREIGN PATENT DOCUMENTS

| JP | 11 60269 | 3/1999 |
|---|---|---|
| SU | 1315401 | 6/1987 |
| WO | WO 03/064342 | 8/2003 |

OTHER PUBLICATIONS

U.S. Appl. No. 10/800,015, filed Mar. 15, 2004.
U.S. Appl. No. 60/548,180, filed Mar. 1, 2004.
U.S. Appl. No. 10/785,716, filed Feb. 25, 2004.
"A Study of Refining Part 1: Measurements of the Refining of a soda-lime-silica Glass With and Without Refining Agents", Cable, Glass Technology vol. 1, No. 4, Aug. 1960.
Journal of the Canadian Ceramic Society, pp. 36-40.
Glass Batch Wetting With Water Parameters and Techniques, Lehman et al., vol. 46, 1977, pp. 35-39.

* cited by examiner

*Primary Examiner*—Jerry Lorengo
*Assistant Examiner*—Matthew E Hoban
(74) *Attorney, Agent, or Firm*—Nixon & Vanderhye P.C.

(57) ABSTRACT

A technique of manufacturing glass having fairly clear color and/or high visible transmission is provided. In certain example embodiments of this invention, it has surprisingly been found that by using carbon-containing compound(s) including $C_xH_yO_z \cdot mH_2O$, excellent melting and refining can be achieved in the manufacture of glass, and not as much ferrous iron is formed compared to the use of elemental carbon as a refining agent. Such compound(s) are especially advantageous when highly transparent clear glass is desired, in that less ferrous iron is formed and thus transmittance and coloration can be improved.

18 Claims, No Drawings

METHOD OF MAKING CLEAR GLASS COMPOSITION

This invention relates to methods of making glass compositions, and glasses resulting from the same. More particularly, this invention relates to a method of making a glass having high light transmittance in the visible range and/or fairly neutral color. Such glass compositions are useful, for example, in architectural windows, patterned glass applications, solar cells, and/or automotive windows.

BACKGROUND OF THE INVENTION

Glass that is fairly clear in color and highly transmissive to visible light (e.g., at least 75% transmissive, or even more preferably at least 80% transmissive) is sometimes desirable. One way of achieving such as glass is to use very pure base glass materials (e.g., substantially free of colorants such as iron). However, base materials with a high degree of purity are expensive and thus not always desirable and/or convenient. In other words, for example, the removal of all iron from glass raw materials has certain practical and/or economical limits.

First and second standard high transmission glass compositions are as follows. These standard compositions, and the methods of making the same, will be referred to herein as Comparative Example (CE) 1 and Comparative Example (CE) 2. The amounts of the various materials below for CE 1 and CE 2 are listed in terms of weight percentage (%) in the glass, unless otherwise indicated, and the optical characteristics were measured at a reference thickness of about 6 mm. Visible transmission was measured in terms of Lta (Ill. C. 2 deg.), whereas the a* and b* transmissive color values were measured in accordance with Ill. D65, 10 deg.

| COMPARATIVE EXAMPLES 1 AND 2 | | |
| --- | --- | --- |
| Element/Characteristic | CE 1 | CE 2 |
| $SiO_2$ | 72.89 | 71.9 |
| $Na_2O$ | 13.48 | 13.66 |
| CaO | 8.57 | 9.12 |
| MgO | 4.06 | 3.76 |
| $Al_2O_3$ | 0.16 | 1.02 |
| $K_2O$ | 0.08 | 0.24 |
| $SO_3$ | 0.223 | 0.186 |
| $TiO_2$ | 0.01 | 0.04 |
| $Cr_2O_3$ | 8 ppm | 5 ppm |
| $Fe_2O_3$ (total iron) | 0.112 | 0.099 |
| % FeO | 0.023 | 0.029 |
| Glass Redox | 0.21 | 0.26 |
| Batch Redox | 6.7 | 6.3 |
| Lta ($T_{vis}$)(%) | 89.1 | 89.06 |
| a* | −1.48 | −1.43 |
| b* | 0.38 | 0.12 |

As can be appreciated from the above, the aforesaid Comparative Example (CE) glasses include rather low amounts of total iron. The total amount of iron present is expressed herein in terms of $Fe_2O_3$ in accordance with standard practice. However, typically, not all iron is in the form of $Fe_2O_3$. Instead, iron is usually present in both the ferrous state ($Fe^{2+}$; expressed herein as FeO, even though all iron in the glass may not be in the form of FeO) and the ferric state ($Fe^{3+}$). Iron in the ferrous state ($Fe^{2+}$; FeO) is a blue-green colorant, while iron in the ferric state ($Fe^{3+}$) is a yellow-green colorant. The blue-green colorant of ferrous iron ($Fe^{2+}$; FeO) is of particular concern when seeking to achieve a fairly clear or neutral colored glass, since as a strong colorant it introduces significant color into the glass. While iron in the ferric state ($Fe^{3+}$) is also a colorant, it is of less concern when seeking to achieve a glass fairly clear in color since iron in the ferric state tends to be weaker as a colorant than its ferrous state counterpart.

When making high transmission glasses, it has been found that the use of elemental carbon (C) (introduced as coke, carbocite, anthracite, or the like) as a reducing agent needed for sulfate refining is undesirable because it tends to cause substantial formation of ferrous iron ($Fe^{2+}$; FeO). As explained above, ferrous iron is of particular concern when trying to achieve highly transparent clear glass because ferrous iron results in both a loss of transmittance and the appearance of blue-green coloration in the glass.

In view of the above, it is apparent that there exists a need in the art for a new technique for making highly transparent substantially clear glasses which can reduce the formation of ferrous iron, thereby permitting high transmission and substantially clear color to be realized.

SUMMARY OF EXAMPLE EMBODIMENTS OF INVENTION

An object of this invention is to provide a glass that has fairly clear color and/or high visible transmission.

In certain example embodiments of this invention, it has surprisingly been found that by using carbon-containing compound(s) comprising $C_xH_yO_z \cdot mH_2O$, excellent melting and refining can be achieved, and not as much ferrous iron is formed compared to the use of elemental carbon as a refining agent. Such compound(s) are advantageous when highly transparent clear glass is desired, in that less ferrous iron is formed and thus transmittance and coloration can be improved. In certain example non-limiting instances, the presence of crystalline water in such compounds improves the glass refining process. In particular, improved wetting of the batch can be achieved with the use of crystalline water (to decrease carry-over of fine fractions of sand, dolomite and/or limestone).

In certain example embodiments of this invention, there is provided a method of making a glass comprising:

| Ingredient | wt. % |
| --- | --- |
| $SiO_2$ | 67-75% |
| $Na_2O$ | 10-20% |
| CaO | 5-15% |
| total iron (expressed as $Fe_2O_3$) | 0.01 to 0.30% | wherein the glass has visible transmission of at least about 90%, a transmissive a* color value of from about −1.5 to +1.0, and a transmissive b* color value of from about −1.0 to +1.5, wherein the method comprises: in a melt, using as a refining agent at least one carbon-containing compound comprising $C_xH_yO_x \cdot mH_2O$ when making the glass.

In certain example embodiments of this invention, there is provided a method of making a glass comprising:

| Ingredient | wt. % |
| --- | --- |
| $SiO_2$ | 67-75% |
| $Na_2O$ | 10-20% |
| CaO | 5-15% |
| total iron (expressed as $Fe_2O_3$) | 0.01 to 0.15% | wherein the glass has visible transmission of at least about 85%, a transmissive a* color value of from about −1.5 to +1.0, and a transmissive b* color value of from about −1.0 to +1.5, wherein the method comprises: in a melt, using as a refining agent at least one carbon-containing compound comprising $C_xH_yO_z$ when making the glass.

DETAILED DESCRIPTION OF CERTAIN EXAMPLE EMBODIMENTS OF THIS INVENTION

Glasses according to different embodiments of this invention may be used, for example, in the automotive industry (e.g., windshields, backlites, side windows, etc.), in architectural window applications, for patterned glass applications, solar cell applications, and/or in other suitable applications.

Certain glasses according to example embodiments of this invention utilize soda-lime-silica flat glass as their base composition/glass. In addition to base composition/glass, it is possible that a unique colorant portion may optionally be provided in order to achieve a glass that is fairly clear in color and/or has a high visible transmission. An exemplary soda-lime-silica base glass according to certain embodiments of this invention, on a weight percentage basis, includes the following basic ingredients:

EXAMPLE BASE GLASS

| Ingredient | Wt. % |
|---|---|
| $SiO_2$ | 67-75% |
| $Na_2O$ | 10-20% |
| CaO | 5-15% |
| MgO | 0-7% |
| $Al_2O_3$ | 0-5% |
| $K_2O$ | 0-5% |

Other minor ingredients, including various conventional refining aids, such as $SO_3$, or the like may also be included in the base glass. In certain embodiments, for example, glass herein may be made from batch raw materials silica sand, soda ash, dolomite, limestone, with the use of salt cake ($SO_3$) and/or Epsom salts (e.g., about a 1:1 combination of both) as refining agents. Preferably, soda-lime-silica based glasses herein include by weight from about 10-15% $Na_2O$ and from about 6-12% CaO.

Elemental carbon (e.g., introduced as coke, carbocite, anthracite, or the like) is a commonly used refining aide in the manufacture of sulfate refined glass. However, it has been found that in making highly transparent clear glasses that the use of elemental carbon as a refining agent is undesirable because it tends to cause substantial formation of ferrous iron ($Fe^{2+}$; FeO). As explained above, substantial amounts of ferrous iron are undesirable if one is trying to achieve a highly transparent clear glass, because ferrous iron results in both a loss of transmittance and the appearance of blue-green coloration in the glass.

To address this problem caused by the use of elemental carbon as a refining agent in the glass melting process, the instant inventors have found that by using carbon-containing compound(s) comprising $C_xH_yO_z.mH_2O$, excellent melting and refining can be achieved, and not as much ferrous iron is formed compared to the use of elemental carbon as a refining agent. Such carbon-containing compound(s) are especially advantageous as refining agents in the glass melting/manufacturing process when highly transparent clear glass is desired, in that less ferrous iron is formed and thus transmittance and coloration can be improved. In certain example non-limiting instances, the presence of crystalline water in such compounds improves the glass refining process.

Example carbon-containing compound(s) comprising $C_xH_yO_z.mH_2O$ that may be used as refining agents in different embodiments of this invention include citric acid (anhydrous and/or hydrated), citric acid monohydrate (e.g., $C_6H_8O_7 \times H_2O$), sucrose (e.g., $C_{12}H_{22}O_{11}$), cream of tartar (potassium sodium tartrate) (e.g., $KNaC_4H_4O_6 \times 4H_2O$), or any mixture or combination thereof. As explained above, these refining agents are surprisingly advantageous in making high transmission substantially colorless glass because less troublesome ferrous iron is formed in the melting/refining process.

In addition to the base glass (e.g., see table above), in making glass according to certain example embodiments of the instant invention the glass batch may include a colorant portion having materials (including colorants and/or oxidizers) which cause the resulting glass to be fairly neutral in color and/or have a high visible light transmission. These materials may either be present in the raw materials (e.g., small amounts of iron), or may be added to the base glass materials in the batch. In certain example embodiments of this invention, the resulting glass may have a visible transmission of at least 75%, more preferably at least 80%, even more preferably of at least 85%, and most preferably of at least about 90%. In certain example non-limiting instances, such high transmissions may be achieved at a non-limiting reference thickness of about 5.6 mm, or alternatively at a non-limiting reference thickness of about 6 mm. In certain example instances, the glass has a visible transmission of at least 90.5% at such reference thicknesses.

In certain embodiments of this invention, in addition to the base glass, the glass batch may optionally comprise or consist essentially of materials as set forth in the table below (in terms of weight percentage of the total glass composition):

EXAMPLE GLASS BATCH (IN ADDITION TO BASE)

| Ingredient | General (Wt. %) | More Preferred | Possible |
|---|---|---|---|
| total iron (expressed as $Fe_2O_3$): | 0.01-0.30% | 0.02-0.12% | 0.02-0.08 |
| % FeO: | 0.001-0.10% | 0.001-0.03% | 0.002-0.010% |
| erbium oxide (e.g., $Er_2O_3$): | 0-0.30% | 0.02-0.20% | 0.03-0.13% |
| cerium oxide (e.g., $CeO_2$): | 0-0.30% | 0-0.18% | 0.00-0.12% |
| cobalt oxide (e.g., $Co_3O_4$): | 0-0.05% | 0-0.001% | 0-0.0005% |

In certain example embodiments of this invention, the colorant portion may be substantially free of other colorants (other than potentially trace amounts). However, it should be appreciated that amounts of other materials (e.g., refining aids, melting aids, colorants and/or impurities) may be present in the glass in certain other embodiments of this invention without taking away from the purpose(s) and/or goal(s) of the instant invention. It is noted that the glass may be free or substantially free of cerium oxide and/or cobalt oxide in certain example embodiments of this invention. In certain example embodiments of this invention, the glass may include no more than 2 ppm Se, more preferably no more than about 1 ppm Se; and/or may include no more than 10 ppm chromium oxide, more preferably no more than 6 ppm chromium oxide; and/or may includes no more than about 2 ppm cobalt oxide, more preferably no more than about 1 ppm cobalt oxide.

The batch is melted and the float process used to form glass (e.g., soda lime silica glass) in a known manner. The aforesaid refining agent(s) are used in this melting procedure. The total amount of iron present in the glass batch and in the resulting glass, i.e., in the colorant portion thereof, is expressed herein in terms of $Fe_2O_3$ in accordance with standard practice. This, however, does not imply that all iron is actually in the form of $Fe_2O_3$ (see discussion above in this regard). Likewise, the amount of iron in the ferrous state ($Fe^{+2}$) is reported herein as FeO, even though all ferrous state iron in the glass batch or glass may not be in the form of FeO. As mentioned above, iron in the ferrous state ($Fe^{2+}$; FeO) is a blue-green colorant, while iron in the ferric state ($Fe^{3+}$) is a yellow-green colorant; and the blue-green colorant of ferrous iron is of particular concern, since as a strong colorant it introduces significant color into the glass which can sometimes be undesirable when seeking to achieve a neutral or clear color.

It has been found that using carbon-containing compound(s) comprising $C_xH_yO_z.mH_2O$ as a refining aide (e.g., instead of elemental C, or in combination with reducing element C) results in a lower glass redox value (i.e., less iron in the ferrous state FeO) and helps improve transmission and coloration to be achieved. In this regard, the proportion of the total iron in the ferrous state (FeO) is used to determine the redox state of the glass, and glass redox is expressed as the ratio $FeO/Fe_2O_3$, which is the weight percentage (%) of iron in the ferrous state (FeO) divided by the weight percentage (%) of total iron (expressed as $Fe_2O_3$) in the resulting glass. In certain example embodiments of this invention, glass may have a redox value (i.e., $FeO/Fe_2O_3$) of less than or equal to 0.25, more preferably less than or equal to 0.20; even more preferably less than or equal to 0.16, and sometimes less than or equal to 0.13 (sometimes even less than 0.10, or less than 0.07).

It is noted that glass according to certain example embodiments of this invention is often made via the known float process in which a tin bath is utilized. It will thus be appreciated by those skilled in the art that as a result of forming the glass on molten tin in certain exemplary embodiments, small amounts of tin or tin oxide may migrate into surface areas of the glass on the side that was in contact with the tin bath during manufacture (i.e., typically, float glass may have a tin oxide concentration of 0.05% or more (wt.) in the first few microns below the surface that was in contact with the tin bath).

In view of the above, glasses according to certain example embodiments of this invention achieve a neutral or substantially clear color and/or high visible transmission. In certain embodiments, resulting glasses according to certain example embodiments of this invention may be characterized by one or more of the following transmissive optical or color characteristics when measured at a thickness of from about 1 mm-6 mm (most preferably a thickness of about 5.6 mm and/or 6 mm, which are non-limiting thicknesses used for purposes of reference only) (Lta is visible transmission %):

| CHARACTERISTICS OF CERTAIN EXAMPLE EMBODIMENTS | | | |
|---|---|---|---|
| Characteristic | General | More Preferred | Most Preferred |
| Lta (Ill. C, 2 deg.): | >=80% | >=85% | >=90% (or >=90.5%) |

-continued

| CHARACTERISTICS OF CERTAIN EXAMPLE EMBODIMENTS | | | |
|---|---|---|---|
| Characteristic | General | More Preferred | Most Preferred |
| L* (Ill. D65, 10 deg.): | 90-100 | n/a | n/a |
| a* (Ill. D65, 10 deg.): | −1.5 to +1.0 | −1.0 to +1.0 | −0.8 to +0.50 |
| b* (Ill. D65, 10 deg.): | −1.0 to +1.5 | −0.7 to +1.0 | −0.1 to +0.5 |

As can be seen from the above table, glasses of certain embodiments of this invention achieve desired features of fairly clear color and/or high visible transmission, while not requiring iron to be eliminated from the glass composition. Moreover, the use of the carbon-containing refining agents discussed above permits more iron impurities to be tolerated in the glass and in the refining process.

Experiments have been performed, comparing refining of glass batch having sodium sulfate (salt cake) at about 1450 degrees C.; where one experiment used elemental carbon and the other experiment used citric acid monohydrate in the refining. Surprisingly, it was found that better and faster refining, and better melting, were realized in the refining where the citric acid monohydrate was used instead of the elemental carbon.

Once given the above disclosure many other features, modifications and improvements will become apparent to the skilled artisan. Such features, modifications and improvements are therefore considered to be a part of this invention, the scope of which is to be determined by the following claims:

What is claimed is:
1. A method of making a glass comprising:

| Ingredient | wt. % |
|---|---|
| $SiO_2$ | 67-75% |
| $Na_2O$ | 10-20% |
| CaO | 5-15% |
| total iron (expressed as $Fe_2O_3$) | 0.01 to 0.30% | wherein the glass has visible transmission of at least about 90%, a transmissive a* color value of from about −1.5 to +1.0, and a transmissive b* color value of from about −1.0 to +1.5, wherein the method comprises:
in a melt, using as a refining aide at least one carbon-containing compound comprising citric acid when making the glass, and wherein the refining aide further includes crystalline water to improve wetting.

2. A method of making a glass comprising:

| Ingredient | wt. % |
|---|---|
| $SiO_2$ | 67-75% |
| $Na_2O$ | 10-20% |
| CaO | 5-15% |
| total iron (expressed as $Fe_2O_3$) | 0.01 to 0.30% | wherein the glass has visible transmission of at least about 90%, a transmissive a* color value of from about −1.5 to +1.0, and a transmissive b* color value of from about −1.0 to +1.5, wherein the method comprises:
in a melt, using as a refining aide at least one carbon-containing compound comprising one or more of citric acid or citric acid monohydrate making the glass, and wherein the refining aide further includes crystalline water to improve wetting.

3. The method of claim 1, wherein the glass comprises:

| | |
|---|---|
| total iron (expressed as $Fe_2O_3$) | 0.02 to 0.20% |
| erbium oxide | 0.02 to 0.20%. |

4. The method of claim 1, wherein the glass comprises:

| | |
|---|---|
| total iron (expressed as $Fe_2O_3$) | 0.054 to 0.20% |
| erbium oxide | 0.02 to 0.15%. |

5. The method of claim 1, wherein the glass comprises:

| | |
|---|---|
| total iron (expressed as $Fe_2O_3$) | 0.06 to 0.10% |
| erbium oxide | 0.03 to 0.10%. |

6. The method of claim 1, wherein the glass has a redox value ($FeO/Fe_2O_3$) no greater than 0.15.

7. The method of claim 1, wherein the glass has a redox value ($FeO/Fe_2O_3$) no greater than 0.10.

8. The method of claim 1, wherein the glass has a transmissive a* color value of −1.0 to +1.0, and a transmissive b* color value of −0.7 to +1.0.

9. The method of claim 1, wherein the glass has a transmissive a* color value of −0.8 to +0.5.

10. The method of claim 1, wherein the glass comprises from 0-5% MgO, from 0-5% $K_2O$ and from 0-5% $Al_2O_3$.

11. A method of making a glass comprising:

| Ingredient | wt. % |
|---|---|
| $SiO_2$ | 67-75% |
| $Na_2O$ | 10-20% |
| CaO | 5-15% |
| total iron (expressed as $Fe_2O_3$) | 0.01 to 0.15% | wherein the glass has visible transmission of at least about 85%, a transmissive a* color value of from about −1.5 to +1.0, and a transmissive b* color value of from about −1.0 to +1.5, wherein the method comprises:

in a melt, using as a refining agent at least one carbon-containing compound comprising citric acid when making the glass.

12. A method of making a glass comprising:

| Ingredient | wt. % |
|---|---|
| $SiO_2$ | 67-75% |
| $Na_2O$ | 10-20% |
| CaO | 5-15% |
| total iron (expressed as $Fe_2O_3$) | 0.01 to 0.15% | wherein the glass has visible transmission of at least about 85%, a transmissive a* color value of from about −1.5 to +1.0, and a transmissive b* color value of from about −1.0 to +1.5, wherein the method comprises:

in a melt, using as a refining agent at least one carbon-containing compound comprising one or more of citric acid or citric acid monohydrate making the glass.

13. The method of claim 2, wherein the glass comprises:

| | |
|---|---|
| total iron (expressed as $Fe_2O_3$) | 0.02 to 0.20% |
| erbium oxide | 0.02 to 0.20%. |

14. The method of claim 2, wherein the glass comprises:

| | |
|---|---|
| total iron (expressed as $Fe_2O_3$) | 0.054 to 0.20% |
| erbium oxide | 0.02 to 0.15%. |

15. The method of claim 2, wherein the glass has a redox value ($FeO/Fe_2O_3$) no greater than 0.15.

16. The method of claim 2, wherein the glass has a redox value ($FeO/Fe_2O_3$) no greater than 0.10.

17. The method of claim 2, wherein the glass has a transmissive a* color value of −1.0 to +1.0, and a transmissive b* color value of −0.7 to +1.0.

18. The method of claim 2, wherein the glass has a transmissive a* color value of −0.8 to +0.5.

* * * * *